US008120532B2

(12) United States Patent
Rofougaran

(10) Patent No.: US 8,120,532 B2
(45) **Date of Patent: *Feb. 21, 2012**

(54) BEAMFORMING RF CIRCUIT AND APPLICATIONS THEREOF

(75) Inventor: Ahmadreza (Reza) Rofougaran, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/732,312

(22) Filed: Mar. 26, 2010

(65) Prior Publication Data

US 2010/0171661 A1 Jul. 8, 2010

Related U.S. Application Data

(63) Continuation of application No. 11/372,560, filed on Mar. 10, 2006, now Pat. No. 7,714,780.

(51) Int. Cl.
*H01S 3/00* (2006.01)

(52) U.S. Cl. ......................... 342/369; 342/370; 342/372

(58) Field of Classification Search ........... 342/369–372
See application file for complete search history.

(56) References Cited

U.S. PATENT DOCUMENTS 6,025,811 A 2/2000 Canora et al.
6,735,182 B1 * 5/2004 Nishimori et al. ............ 342/372
7,433,713 B2 * 10/2008 Haskell et al. ................ 342/372
2002/0187812 A1 * 12/2002 Guo .............................. 455/562
2003/0036359 A1 * 2/2003 Dent et al. ...................... 455/69
2003/0206134 A1 * 11/2003 Lier et al. ...................... 342/368
2004/0127168 A1 * 7/2004 Ito .............................. 455/562.1
2004/0178954 A1 * 9/2004 Vook et al. .................... 342/383
2005/0037733 A1 * 2/2005 Coleman et al. .............. 455/411
2005/0088356 A1 * 4/2005 Lenormand ............... 343/781 R
2005/0136980 A1 * 6/2005 Kim et al. .................. 455/562.1
2007/0035442 A1 * 2/2007 Manasson et al. ............ 342/375

FOREIGN PATENT DOCUMENTS

CN 1777992 A 5/2006

OTHER PUBLICATIONS

T. Haynes, A Primer on Digital Beamforming, http://www.spectrumsignal.com/publications/beamform_primer.pdf, Mar. 1998.*
A.K. Agrawal et al., Beamformer architectures for active phased-array radar antennas, IEEE Transactions on Antennas and Propagation, vo. 47(3), p. 432-442, Mar. 1999.*

* cited by examiner

*Primary Examiner* — Thomas Tarcza
*Assistant Examiner* — Fred H Mull
(74) *Attorney, Agent, or Firm* — Garlick Harrison & Markison; Jessica W. Smith

(57) ABSTRACT

A beamforming radio frequency (RF) circuit includes a plurality of antennas, a plurality of amplifiers and an adjust module. The plurality of antennas is operably coupled to interrelate a plurality of beamformed signal components with a beamformed signal. The plurality of amplifiers is operably coupled to interrelate the plurality of beamformed signal components with a plurality of adjusted signal components. The adjust module is operably coupled to interrelate coordinates of a signal with the plurality of adjusted signal components.

16 Claims, 9 Drawing Sheets

BEAMFORMING RF CIRCUIT AND APPLICATIONS THEREOF

CROSS REFERENCE TO RELATED PATENTS

This U.S. patent application claims priority under 35 U.S.C. §120 as a continuation application to a prior filed utility patent application entitled, "Beamforming RF Circuit and Applications Thereof," having a filing date of Mar. 10, 2006, and an application Ser. No. of 11/372,560.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

1. Technical Field of the Invention

This invention relates generally to wireless communication systems and more particularly to beamforming.

2. Description of Related Art

Communication systems are known to support wireless and wire lined communications between wireless and/or wire lined communication devices. Such communication systems range from national and/or international cellular telephone systems to the Internet to point-to-point in-home wireless networks to radio frequency identification (RFID) systems. Each type of communication system is constructed, and hence operates, in accordance with one or more communication standards. For instance, wireless communication systems may operate in accordance with one or more standards including, but not limited to, IEEE 802.11, Bluetooth, advanced mobile phone services (AMPS), digital AMPS, global system for mobile communications (GSM), code division multiple access (CDMA), local multi-point distribution systems (LMDS), multi-channel-multi-point distribution systems (MMDS), and/or variations thereof.

Depending on the type of wireless communication system, a wireless communication device, such as a cellular telephone, two-way radio, personal digital assistant (PDA), personal computer (PC), laptop computer, home entertainment equipment, RFID reader, RFID tag, et cetera communicates directly or indirectly with other wireless communication devices. For direct communications (also known as point-to-point communications), the participating wireless communication devices tune their receivers and transmitters to the same channel or channels (e.g., one of the plurality of radio frequency (RF) carriers of the wireless communication system) and communicate over that channel(s). For indirect wireless communications, each wireless communication device communicates directly with an associated base station (e.g., for cellular services) and/or an associated access point (e.g., for an in-home or in-building wireless network) via an assigned channel. To complete a communication connection between the wireless communication devices, the associated base stations and/or associated access points communicate with each other directly, via a system controller, via the public switch telephone network, via the Internet, and/or via some other wide area network.

For each wireless communication device to participate in wireless communications, it includes a built-in radio transceiver (i.e., receiver and transmitter) or is coupled to an associated radio transceiver (e.g., a station for in-home and/or in-building wireless communication networks, RF modem, etc.). As is known, the receiver is coupled to the antenna and includes a low noise amplifier, one or more intermediate frequency stages, a filtering stage, and a data recovery stage. The low noise amplifier receives inbound RF signals via the antenna and amplifies then. The one or more intermediate frequency stages mix the amplified RF signals with one or more local oscillations to convert the amplified RF signal into baseband signals or intermediate frequency (IF) signals. The filtering stage filters the baseband signals or the IF signals to attenuate unwanted out of band signals to produce filtered signals. The data recovery stage recovers raw data from the filtered signals in accordance with the particular wireless communication standard.

As is also known, the transmitter includes a data modulation stage, one or more intermediate frequency stages, and a power amplifier. The data modulation stage converts raw data into baseband signals in accordance with a particular wireless communication standard. The one or more intermediate frequency stages mix the baseband signals with one or more local oscillations to produce RF signals. The power amplifier amplifies the RF signals prior to transmission via an antenna.

In many systems, the transmitter will include one antenna for transmitting the RF signals, which are received by a single antenna, or multiple antennas, of a receiver. When the receiver includes two or more antennas, the receiver will select one of them to receive the incoming RF signals. In this instance, the wireless communication between the transmitter and receiver is a single-output-single-input (SISO) communication, even if the receiver includes multiple antennas that are used as diversity antennas (i.e., selecting one of them to receive the incoming RF signals). For SISO wireless communications, a transceiver includes one transmitter and one receiver. Currently, most wireless local area networks (WLAN) that are IEEE 802.11, 802.11a, 802,11b, or 802.11g compliant or RFID standard compliant employ SISO wireless communications.

Other types of wireless communications include single-input-multiple-output (SIMO), multiple-input-single-output (MISO), and multiple-input-multiple-output (MIMO). In a SIMO wireless communication, a single transmitter processes data into radio frequency signals that are transmitted to a receiver. The receiver includes two or more antennas and two or more receiver paths. Each of the antennas receives the RF signals and provides them to a corresponding receiver path (e.g., LNA, down conversion module, filters, and ADCs). Each of the receiver paths processes the received RF signals to produce digital signals, which are combined and then processed to recapture the transmitted data.

For a multiple-input-single-output (MISO) wireless communication, the transmitter includes two or more transmission paths (e.g., digital to analog converter, filters, up-conversion module, and a power amplifier) that each converts a corresponding portion of baseband signals into RF signals, which are transmitted via corresponding antennas to a receiver. The receiver includes a single receiver path that receives the multiple RF signals from the transmitter. In this instance, the receiver uses beamforming to combine the multiple RF signals into one signal for processing.

For a multiple-input-multiple-output (MIMO) wireless communication, the transmitter and receiver each include multiple paths. In such a communication, the transmitter parallel processes data using a spatial and time encoding function to produce two or more streams of data. The transmitter includes multiple transmission paths to convert each stream of data into multiple RF signals. The receiver receives the multiple RF signals via multiple receiver paths that recapture the streams of data utilizing a spatial and time decoding function. The recaptured streams of data are combined and subsequently processed to recover the original data.

To further improve wireless communications, transceivers may incorporate beamforming. In general, beamforming is a processing technique to create a focused antenna beam by shifting a signal in time or in phase to provide gain of the signal in a desired direction and to attenuate the signal in other directions. Prior art papers (1) Digital beamforming basics (antennas) by Steyskal, Hans, Journal of Electronic Defense, Jul. 1, 1996; (2) Utilizing Digital Downconverters for Efficient Digital Beamforming, by Clint Schreiner, Red River Engineering, no publication date; and (3) Interpolation Based Transmit Beamforming for MIMO-OFMD with Partial Feedback, by Jihoon Choi and Robert W. Heath, University of Texas, Department of Electrical and Computer Engineering, Wireless Networking and Communications Group, Sep. 13, 2003 discuss beamforming concepts.

In a known beamforming transmitter embodiment, the beamforming transmitter includes the data modulation stage, one or more intermediate frequency (IF) stages, the power amplifier, and a plurality of phase modules. The data modulation stage, the one or more IF stages and the power amplifier operate as discussed above to produce an amplified outbound RF signal. The plurality of phase modules adjust the phase of the amplified outbound RF signal in accordance with a beamforming matrix to produce a plurality of signals that are subsequently transmitted by a set of antennas.

While such a beamforming transmitter provides a functioning transmitter, it requires multiple high frequency, and thus accurate, phase modules and since the phase modules are adjusting the same signal, the resulting magnitude of the phase adjusted signals is the same. Note that gain adjust modules may be added in series with the phase modules, but further adds to the complexity and component count of the beamforming transmitter.

Therefore, a need exists for a beamforming RF circuit that substantially overcomes one or more of the above mentioned limitations.

BRIEF SUMMARY OF THE INVENTION

The present invention is directed to apparatus and methods of operation that are further described in the following Brief Description of the Drawings, the Detailed Description of the Invention, and the claims. Other features and advantages of the present invention will become apparent from the following detailed description of the invention made with reference to the accompanying drawings.

BRIEF DESCRIPTION OF THE SEVERAL VIEWS OF THE DRAWING(S)

DETAILED DESCRIPTION OF THE INVENTION

Figure 1:
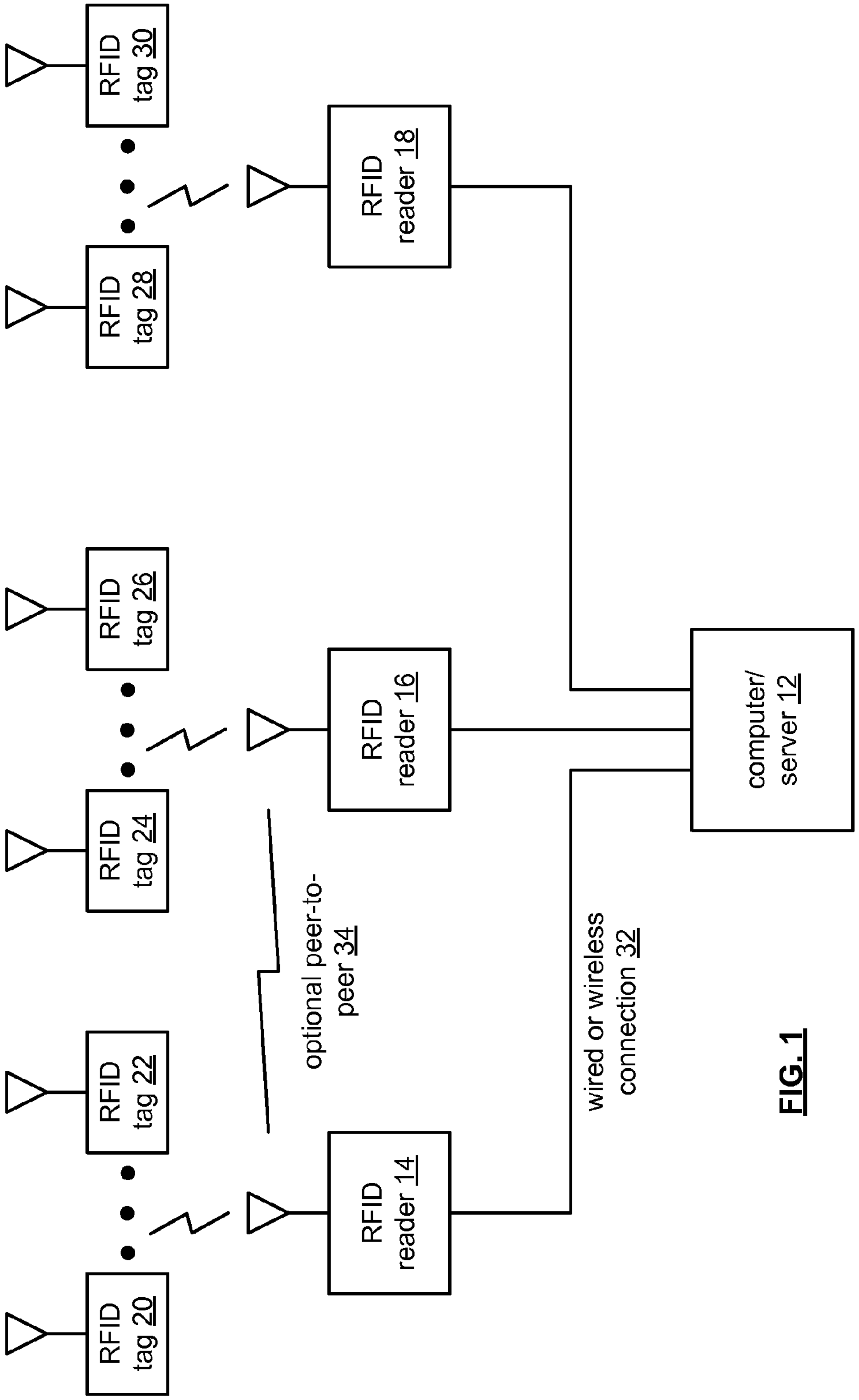
FIG. 1 is a schematic block diagram of an RFID network in accordance with the present invention.

FIG. 1 is a schematic block diagram of an RFID (radio frequency identification) system that includes a computer/server 12, a plurality of RFID readers 14-18 and a plurality of RFID tags 20-30. The RFID tags 20-30 may each be associated with a particular object for a variety of purposes including, but not limited to, tracking inventory, tracking status, location determination, assembly progress, et cetera.

Each RFID reader 14-18 wirelessly communicates with one or more RFID tags 20-30 within its coverage area. For example, RFID reader 14 may have RFID tags 20 and 22 within its coverage area, while RFID reader 16 has RFID tags 24 and 26, and RFID reader 18 has RFID tags 28 and 30 within its coverage area. The RF communication scheme between the RFID readers 14-18 and RFID tags 20-30 may be a back scatter technique whereby the RFID readers 14-18 provide energy to the RFID tags via an RF signal. The RFID tags derive power from the RF signal and respond on the same RF carrier frequency with the requested data.

In this manner, the RFID readers 14-18 collect data as may be requested from the computer/server 12 from each of the RFID tags 20-30 within its coverage area. The collected data is then conveyed to computer/server 12 via the wired or wireless connection 32 and/or via the peer-to-peer communication 34. In addition, and/or in the alternative, the computer/server 12 may provide data to one or more of the RFID tags 20-30 via the associated RFID reader 14-18. Such downloaded information is application dependent and may vary greatly. Upon receiving the downloaded data, the RFID tag would store the data in a non-volatile memory.

As indicated above, the RFID readers 14-18 may optionally communicate on a peer-to-peer basis such that each RFID reader does not need a separate wired or wireless connection 32 to the computer/server 12. For example, RFID reader 14 and RFID reader 16 may communicate on a peer-to-peer basis utilizing a back scatter technique, a wireless LAN technique, and/or any other wireless communication technique. In this instance, RFID reader 16 may not include a wired or wireless connection 32 computer/server 12. Communications between RFID reader 16 and computer/server 12 are conveyed through RFID reader 14 and the wired or wireless connection 32, which may be any one of a plurality of wired standards (e.g., Ethernet, fire wire, et cetera) and/or wireless communication standards (e.g., IEEE 802.11x, Bluetooth, et cetera).

As one of ordinary skill in the art will appreciate, the RFID system of FIG. 1 may be expanded to include a multitude of RFID readers 14-18 distributed throughout a desired location (for example, a building, office site, et cetera) where the RFID tags may be associated with equipment, inventory, personnel, et cetera. Note that the computer/server 12 may be coupled to another server and/or network connection to provide wide area network coverage. Further note that the carrier frequency of the wireless communication between the RFID readers 14-18 and RFID tags 20-30 may range from about 10 MHz to several gigahertz.

Figure 2:
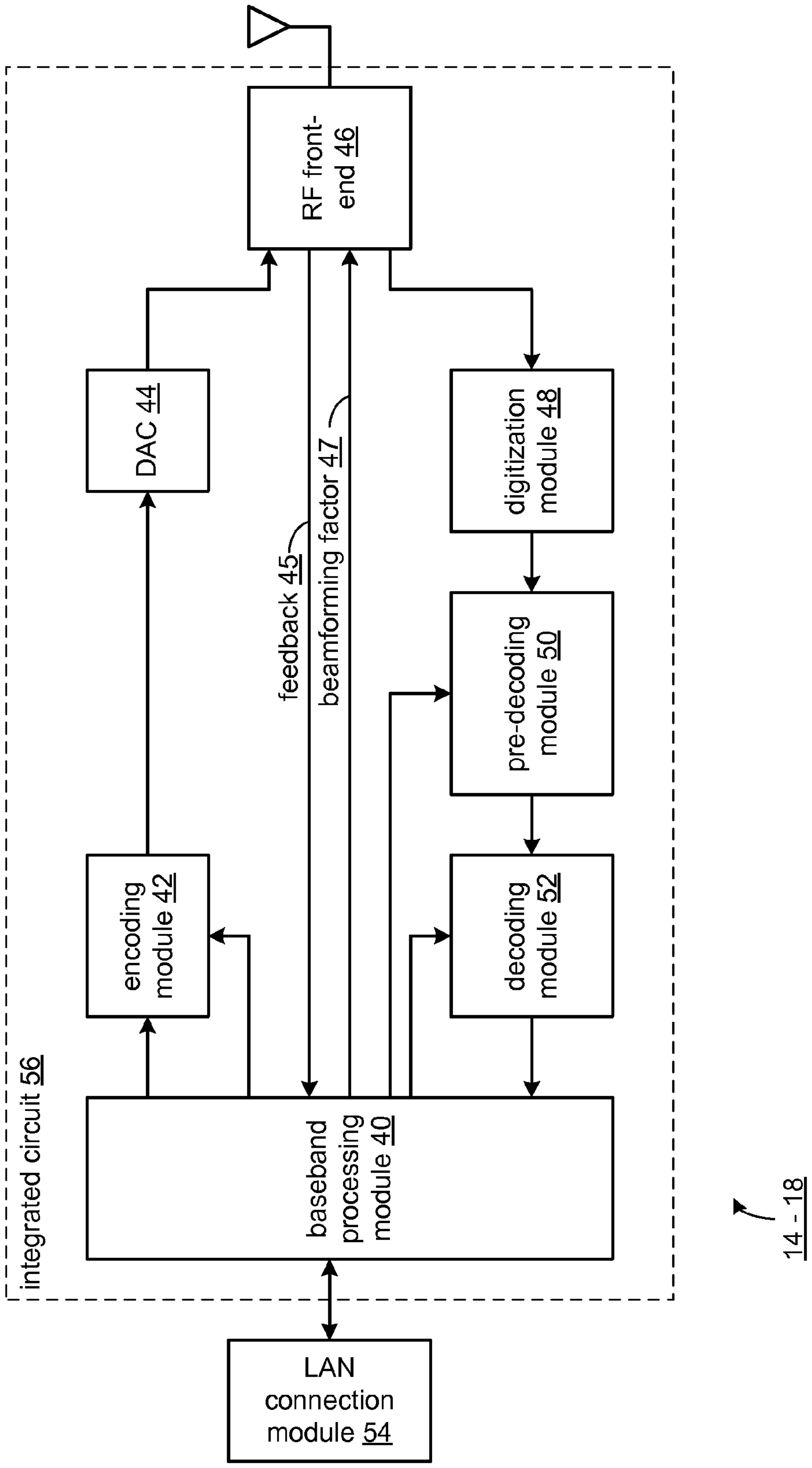
FIG. 2 is a schematic block diagram of an RFID reader in accordance with the present invention.

FIG. 2 is a schematic block diagram of an RFID reader 14-18 that includes an integrated circuit 56 and may further include a local area network (LAN) connection module 54. The integrated circuit 56 includes baseband processing module 40, an encoding module 42, a digital-to-analog converter (DAC) 44, an RF front-end 46, digitization module 48, predecoding module 50 and a decoding module 52. The local area network connection module 54 may include one or more of a wireless network interface (e.g., 802.11n.x, Bluetooth, et cetera) and/or a wired communication interface (e.g., Ethernet, fire wire, et cetera).

The baseband processing module 40, the encoding module 42, the decoding module 52 and the pre-decoding module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The one or more processing devices may have an associated memory element, which may be a single memory device, a plurality of memory devices, and/or embedded circuitry of the processing device. Such a memory device may be a read-only memory, random access memory, volatile memory, non-volatile memory, static memory, dynamic memory, flash memory, cache memory, and/or any device that stores digital information. Note that when the processing module 40, 42, 50, and/or 52 implements one or more of its functions via a state machine, analog circuitry, digital circuitry, and/or logic circuitry, the memory element storing the corresponding operational instructions may be embedded within, or external to, the circuitry comprising the state machine, analog circuitry, digital circuitry, and/or logic circuitry. Further note that, the memory element stores, and the processing module 40, 42, 50, and/or 52 executes, hard coded or operational instructions corresponding to at least some of the steps and/or functions illustrated in FIGS. 2-9.

In operation, the baseband processing module 40 prepares data for encoding via the encoding module 42, which may perform a data encoding in accordance with one or more RFID standardized protocols. In addition, the baseband processing module 40 generates a beamforming factor 47 based on feedback 45 from the RF front-end 46. The encoded data is provided to the digital-to-analog converter 44 which converts the digitally encoded data into an analog signal. The RF front-end 46 modulates the analog signal to produce an RF signal at a particular carrier frequency (e.g., 900 MHz) that is provided to an antenna array in accordance with the beamforming factor 47.

The RF front-end 46, which will be described in greater detail with reference to FIGS. 3-9, includes transmit blocking capabilities such that the energy of the transmit signal does not substantially interfere with the receiving of a back scattered RF signal received from one or more RFID tags. The RF front-end 46 converts the received RF signal into a baseband signal. The digitization module 48, which may be a limiting module or an analog-to-digital converter, converts the received baseband signal into a digital signal. The predecoding module 50 converts the digital signal into a biphase encoded signal in accordance with the particular RFID protocol being utilized. The biphase encoded data is provided to the decoding module 52, which recaptures data therefrom in accordance with the particular encoding scheme of the selected RFID protocol. The baseband processing module 40 provides the recovered data to the server and/or computer via the local area network connection module 54. As one of ordinary skill in the art will appreciate, the RFID protocols include one or more of line encoding schemes such as Manchester encoding, FM0 encoding, FM1 encoding, etc. As one of ordinary skill in the art will further appreciate, the beamforming interaction between the baseband processing module 40 and the RF front end 46 has far more applications than RFID applications. For instance, the beamforming interaction may be used in wireless local area network (WLAN) applications, cellular telephone applications, personal area networks (e.g., Bluetooth) applications, etc.

Figure 3:
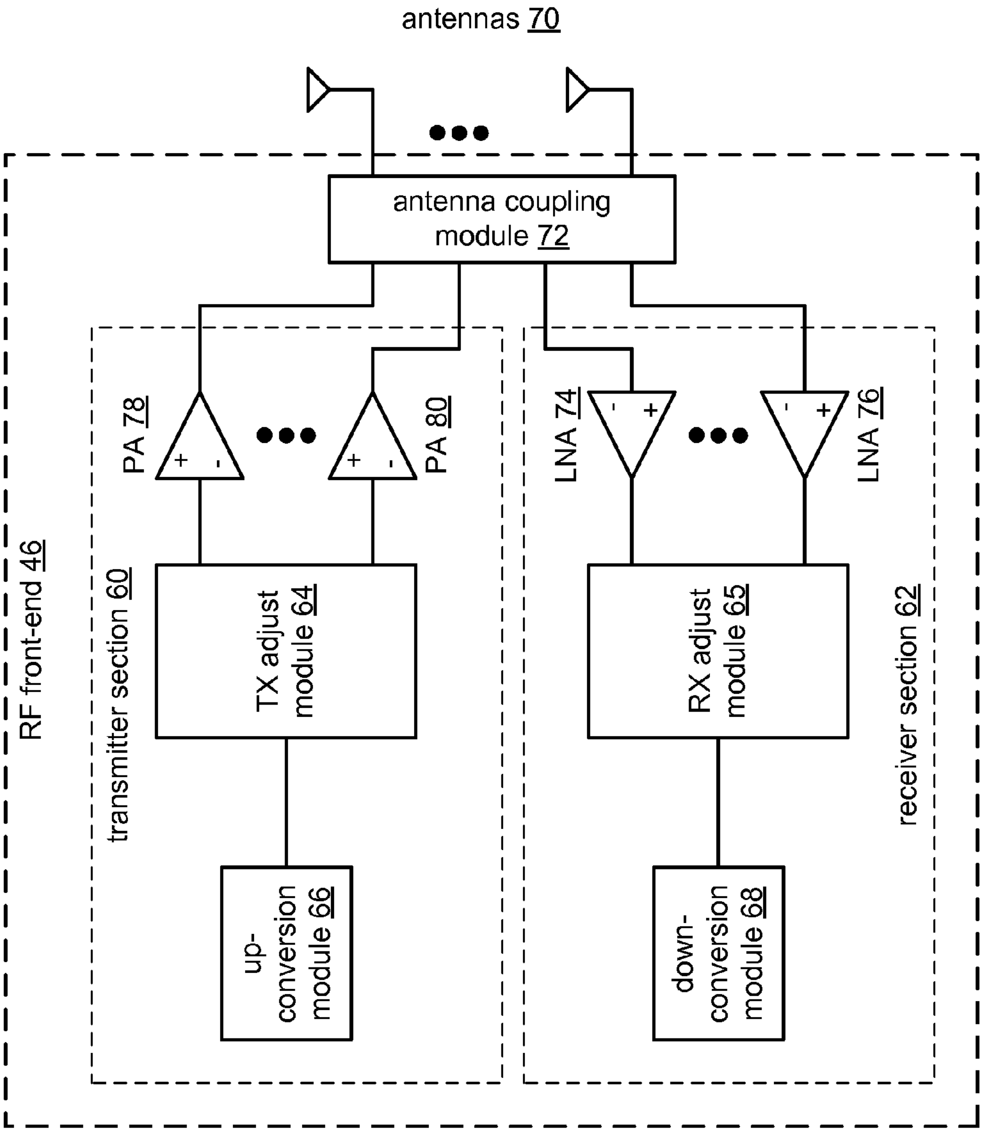
FIG. 3 is a schematic block diagram of an RF front-end in accordance with the present invention.

FIG. 3 is a schematic block diagram of an embodiment of the RF front-end 46 coupled to a plurality of antennas 70. The RF front-end 46 includes a transmitter section 60, a receiver section 62, and an antenna coupling module 72. The transmitter section 60 includes an up conversion module 66, a transmit adjust module 64, and a plurality of power amplifiers 78-80. The receiver section 62 includes a down conversion module 68, a receive adjust module 65, and a plurality of low noise amplifiers 74-76. Note that, in one embodiment, the combination of the plurality of antennas 70, the plurality of amplifiers (e.g., power amplifiers 78-80) or low noise amplifiers 74-76, and an adjust module (e.g., transmit adjust module 64 or receive adjust module 65) form a beamforming RF circuit.

The antenna coupling module 72 is coupled to a plurality of antennas 70, where, in one embodiment, the coupling may be a direct coupling of the power amplifiers to the antennas and a direct coupling of the low noise amplifiers to the antennas. In another embodiment, the antenna coupling module 72 may include a transmit-receive switch. In yet another embodiment, the antenna coupling module 72 may include a transformer balun.

In operation of an embodiment of a beamforming circuit, the plurality of antennas 70 is operably coupled to interrelate a plurality of beamformed signal components with a beamform signal. The plurality of amplifiers 74-76 or 78-80 is operably coupled to interrelate the plurality of beamformed signal components with a plurality of adjusted signal components. The adjust module 64 or 65 is operably coupled to interrelate coordinates of a signal with the plurality of adjusted signal components.

For example, the transmit adjust module 64 receives an outbound RF signal from the up conversion module 66 and adjust the coordinates of the outbound RF signal to produce a plurality of adjusted signal components. The coordinates may be adjusted by a one or more phase delays of the outbound RF signal and/or one or more amplitude adjustments of the outbound RF signal. As such, each of the plurality of adjusted signal components can have a desired phase delay with respect to the outbound RF signal and a desired amplitude adjustment with respect to the outbound RF signal.

Continuing with the present example, each of the power amplifiers 78-80 amplifies a corresponding one of the plurality of adjusted signal components to produce the plurality of beamform signal components. Note that the gain of each of the power amplifiers 78-80 may be the same or separately adjusted to provide amplitude adjustment of the corresponding one of the plurality of adjusted signal components. Further note that if the gain of the power amplifiers 78-80 is adjusted to provide amplitude adjustments, the adjust module 64 may only perform a phase adjust of the signal components.

Further continuing with the present example, the plurality of antennas 70 transmit the plurality of beamformed signal components, which combine in air to produce a beamformed signal. Note that the spacing between the plurality of antennas 70 affects how the plurality of beamformed signal components are combined in the air. For instance, the spacing between the plurality of antennas 70 may be a fraction of a wavelength of the RF signals being transceived, a wavelength of the RF signals, and/or multiple wavelengths of the RF signals.

As another example of the operation of an embodiment of a beamforming circuit, each of the plurality of antennas 70 provides a corresponding representation of a received beamformed signal (i.e., a corresponding one of a plurality of beamformed signal components) to a corresponding one of the plurality of low noise amplifiers (LNA) 74-76. Each of the low noise amplifiers 74-76 amplifies the corresponding one of the plurality of beamform signal components to produce a plurality of adjusted signal components. Note that the gain of the LNA 74-76 may be the same or different. The receive adjust module 65 converts the plurality of adjusted signal components into an inbound RF signal.

The down conversion module 68 converts the inbound RF signal into an inbound baseband signal. In one embodiment, the down conversion module 68 includes a direct conversion topology of a pair of mixers and a corresponding local oscillation module. In another embodiment, the down conversion module 68 includes two intermediate frequency mixing stages and corresponding local oscillations.

As mentioned above, the up conversion module 66 provides the outbound RF signal to the TX adjust module 64. To produce the outbound RF signal, the up conversion module 66 mixes an outbound baseband signal with a local oscillation. In one embodiment, the up conversion module 66 includes a direct conversion topology of mixers and a local oscillation module. In another embodiment, the up conversion module 66 includes two intermediate frequency stages and corresponding local oscillation modules.

As one of ordinary skill in the art will appreciate, the transmit adjust module 64 and receive adjust module 65 may be separate modules as illustrated in FIG. 3 or may be a single module operably coupled to adjust the coordinates of a signal to produce a plurality of adjusted signal components.

Figure 4:
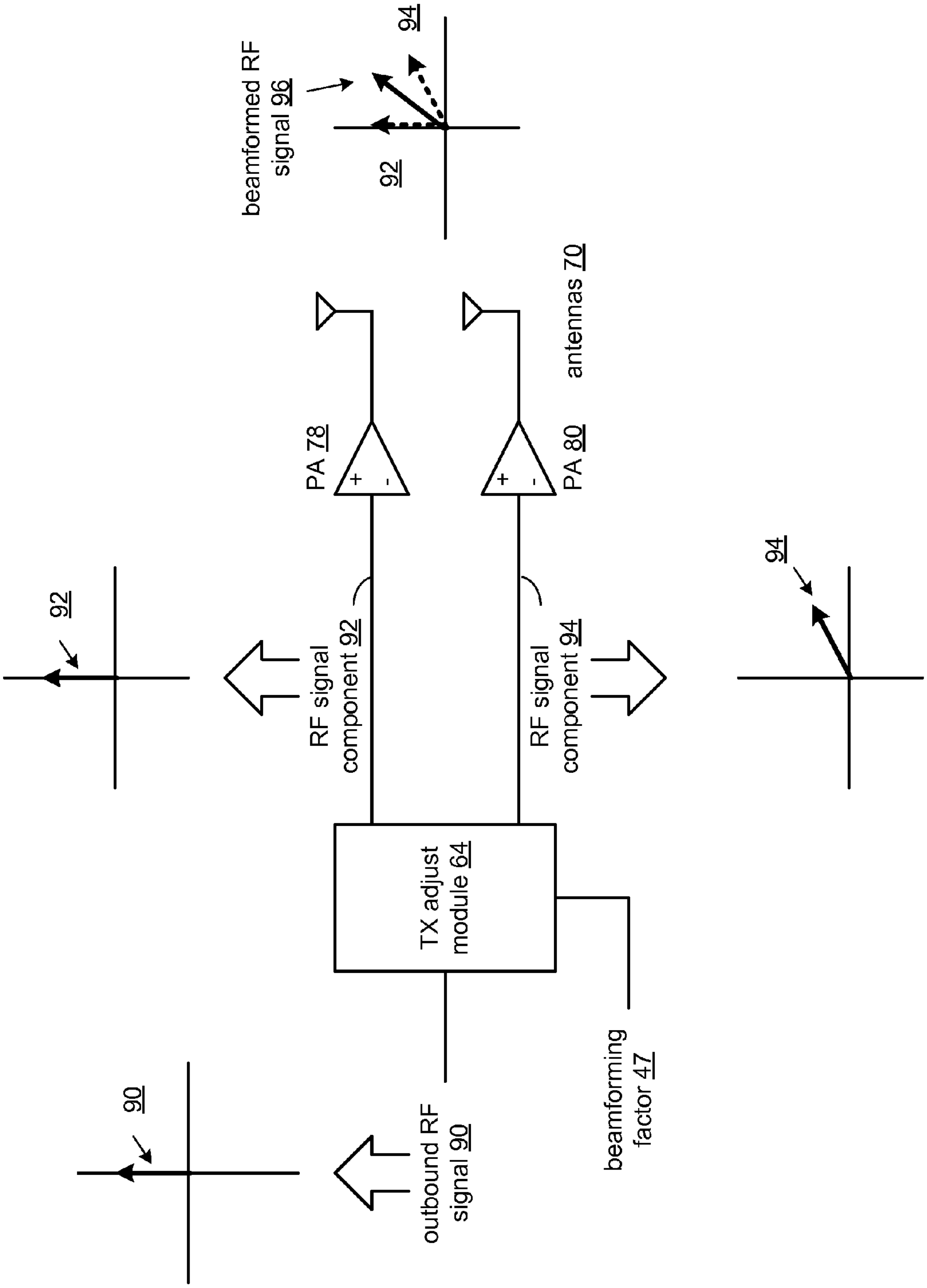
FIG. 4 is a schematic and functional diagram of a transmitter section of an RF front-end in accordance with the present invention.

FIG. 4 is a schematic and functional diagram of the transmit adjust module 64, the plurality of power amplifiers 78-80, and the plurality of antennas 70. In one embodiment, the transmit adjust module 64 receives an outbound RF signal 90, which may be a sinusoidal signal or complex signal having an in-phase component and a quadrature component. For this example, the outbound RF signal 90 is a cosine waveform, which is illustrated as a vector having coordinates of an amplitude (e.g., the length of the arrow) and a phase shift of 90°. As one of ordinary skill in the art will appreciate, the coordinates of the outbound RF signal 90 may be polar coordinates or Cartesian coordinates.

The transmit adjust module 64 adjusts the phase and/or amplitude of the outbound RF signal 90 based on a beamforming factor 47. The determination of the beamforming factor 47 will be described in greater detail with reference to FIGS. 8 and 9. In this example, the beamforming factor 47 indicates that two RF signal components 92 and 94 are to be generated from the outbound RF signal 90. The $1^{st}$ RF signal component 92 is a zero phase adjust and a zero amplitude adjust representation of the outbound RF signal 90. As such, the RF signal component 92 is a replica of the outbound RF signal 90.

The beamforming factor 74 indicated that the $2^{nd}$ RF signal component 94 is to have a phase shift of approximately −60° and a zero amplitude adjustment. The resulting $2^{nd}$ RF signal component 94 is shown as a vector having the same amplitude as the outbound RF signal 90 with a −60° degree phase shift. As one of ordinary skill in the art will appreciate, the TX adjust module 64 may produce more than two RF signal components depending on the desired beamformed signal and the transmit circuitry available.

The power amplifiers 78-80 amplify the respective RF signal components to produce amplified RF signal components 92 and 94. The power amplifiers 78 and 80 may have their gains adjusted in accordance with the beamforming factor 47 to further adjust the corresponding RF signal component 92 and 94. In this example, the gains of the power amplifiers is the same, thus with respect to each other, the magnitudes of the amplified RF signal components is the same.

The antennas 70 transmit the corresponding amplified RF signal components 92 and 94 to produce a beamformed RF signal 96. The beamforming of the beamformed RF signal 96 is done in air based on a vector summation of the amplified RF signal components 92 and 94. As shown, the beamformed RF signal 96 has an amplitude and a phase that corresponds to the vector summation of RF signal components 92 and 94. Note that, in this embodiment, the antennas 70 have the same polarization such that the antenna radiation pattern is in the same direction. In another embodiment, the antennas 70 may have different polarizations such that the antenna radiation pattern are in different directions (e.g., at 90° of each other). Further note that by adjusting the phase of the RF signal components and/or the amplitudes of the RF signal components, a beamformed RF signal 96 may be generated having a desired magnitude with a desired phase shift. As such, regardless of the direction of the targeted receiver with respect to the transmitter, a beamformed RF signal 96 may be produced to provide a maximum amount of energy transmitted in the direction of the receiver.

Figure 5:
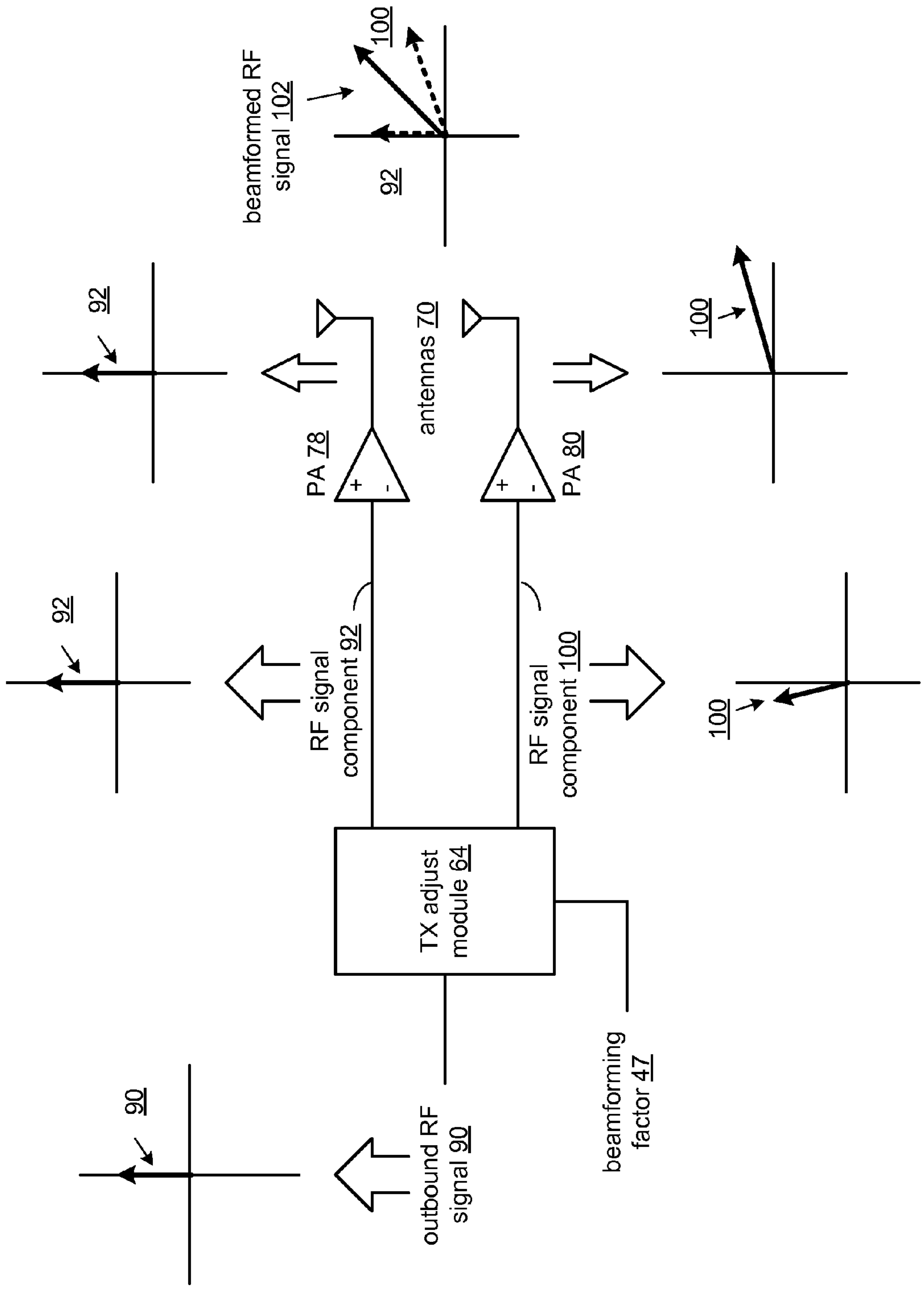
FIG. 5 is a schematic and functional diagram of another embodiment of a transmitter section of an RF front-end in accordance with the present invention.

FIG. 5 is a schematic block diagram and functional diagram of another embodiment of the transmit adjust module 64. In this embodiment, the antennas 70 have different polarizations where the antenna radiation patterns are at 90° of each other. In this example, the transmit adjust module 64 produces RF signal components 92 and 100 from the outbound RF signal 90 in accordance with the beamforming factors. As in the previous example of FIG. 4, the outbound RF signal 90 is represented by a cosine signal. The transmit adjust module 64 generates the RF signal component 92 with no phase or amplitude shifting of the outbound RF signal 90 thus producing a replica of the outbound RF signal 90.

The transmit adjust module 64, in this example, produces the RF signal component 100 by adding a 15° phase shift of the outbound RF signal 90 without an amplitude adjustment. The resulting RF signal component 100 is shown as a vector having the same magnitude as the outbound RF signal with a 15° phase shift. Note that, in this example, the sign and amount of phase shifting is determined in light of the polarization of the antennas as will be discussed subsequently.

In this example, the power amplifiers 78-80 have different gain settings, where the gain of power amplifier 80 is greater than the gain of power amplifier 78. Note that the gains of the power amplifiers 78-80 are set in accordance with the beamforming factor 47. The power amplifiers 78-80, with their different gains, amplify the corresponding RF signal components to produce amplified RF signal components.

The antennas 70, with different polarizations, transmit the corresponding RF signal components 92 and 100 to produce, in air, the beamformed RF signal 102. As shown, the amplified RF signal component 92 when transmitted via a $1^{st}$ antenna has coordinates corresponding to a cosine waveform. The antenna which transmits the RF signal component 100, due to its different polarization with respect to the $1^{st}$ antenna, transmits the RF signal component 100 as a sine wave with a 15° phase shift. The resulting beamformed RF signal 102 is a vector summation of the transmitted RF signal component 92 and the transmitted RF signal component 100.

As one of ordinary skill in the art will appreciate, the power amplifiers 78-80 may be linear power amplifiers or non-linear amplifiers. As one of ordinary skill in the art will further appreciate, non-linear power amplifiers simplify transmitter design and/or allow greater transmit power than similar sized linear power amplifiers.

Figure 6:
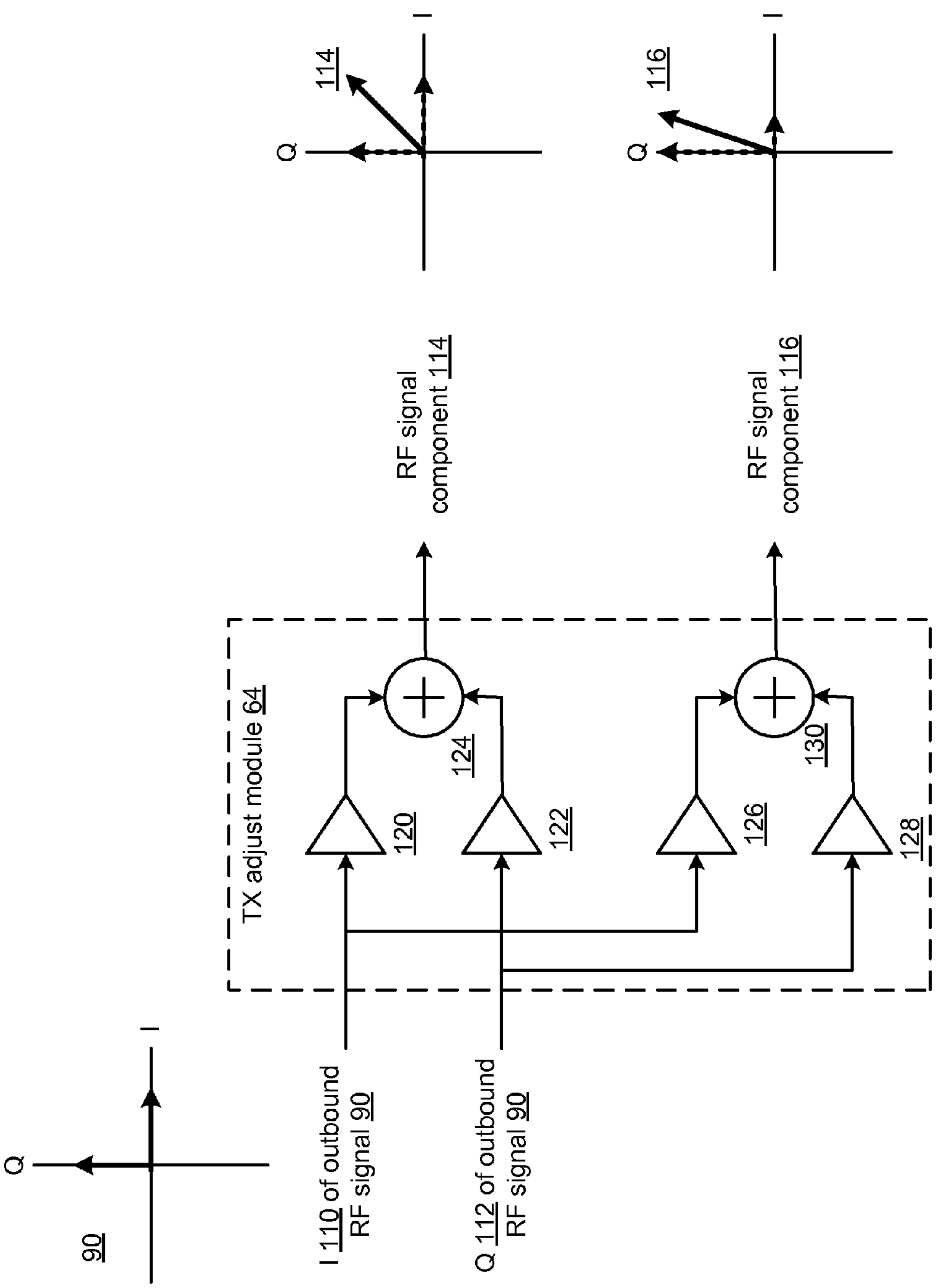
FIG. 6 is a schematic block diagram of a transmit adjust module in accordance with the present invention.

FIG. 6 is a schematic block diagram of an embodiment of a transmit adjust module 64. In this embodiment, the transmit adjust module 64 includes a plurality of gain stages 120, 122, 126 and 128 and a plurality of summation modules 124 and 130. As shown, the RF signal is a complex signal including an in-phase (I) component 110 and a quadrature (Q) component 112 of equal magnitudes, but 90° offset from each other.

The gain modules 120 and 122 amplify the in-phase component 110 of RF signal 90 and the quadrature component 112 of the RF signal 90 in accordance with the beamforming factor 47. If the gains are equal, the summation module 124 will produce a RF signal component 114 that has a phase shift of 45° and a magnitude corresponding to the vector summation of the magnitudes of the in-phase component 110 and the quadrature component 112. This is shown as the polar coordinate plot of the RF signal component 114.

Gain modules 126 and 128 amplify the in-phase component 110 and quadrature component 112 of the outbound RF signal 90. In this example, the gains are not equal such that when the summation module 130 sums the components to produce RF signal component 116 the phase angle is at a desired value. For example, if gain stage 126 reduces the magnitude of the in-phase component 110 while gain stage 128 increases the magnitude of the quadrature component 112, the resulting RF component 116 will have a polar coordinate plot similar to that illustrated in FIG. 6. Further, note that the gain stages may include an inversion stage such that 180° phase shifted representation of the in-phase or quadrature signal component may be summed to produce any desired phase angle shift in the corresponding RF signal component. Alternatively, summation module 124 and/or 130 may be a subtraction module such that the in-phase component is subtracted from the quadrature component or vice versa to achieve a different phase of the resulting RF signal component.

Figure 7:
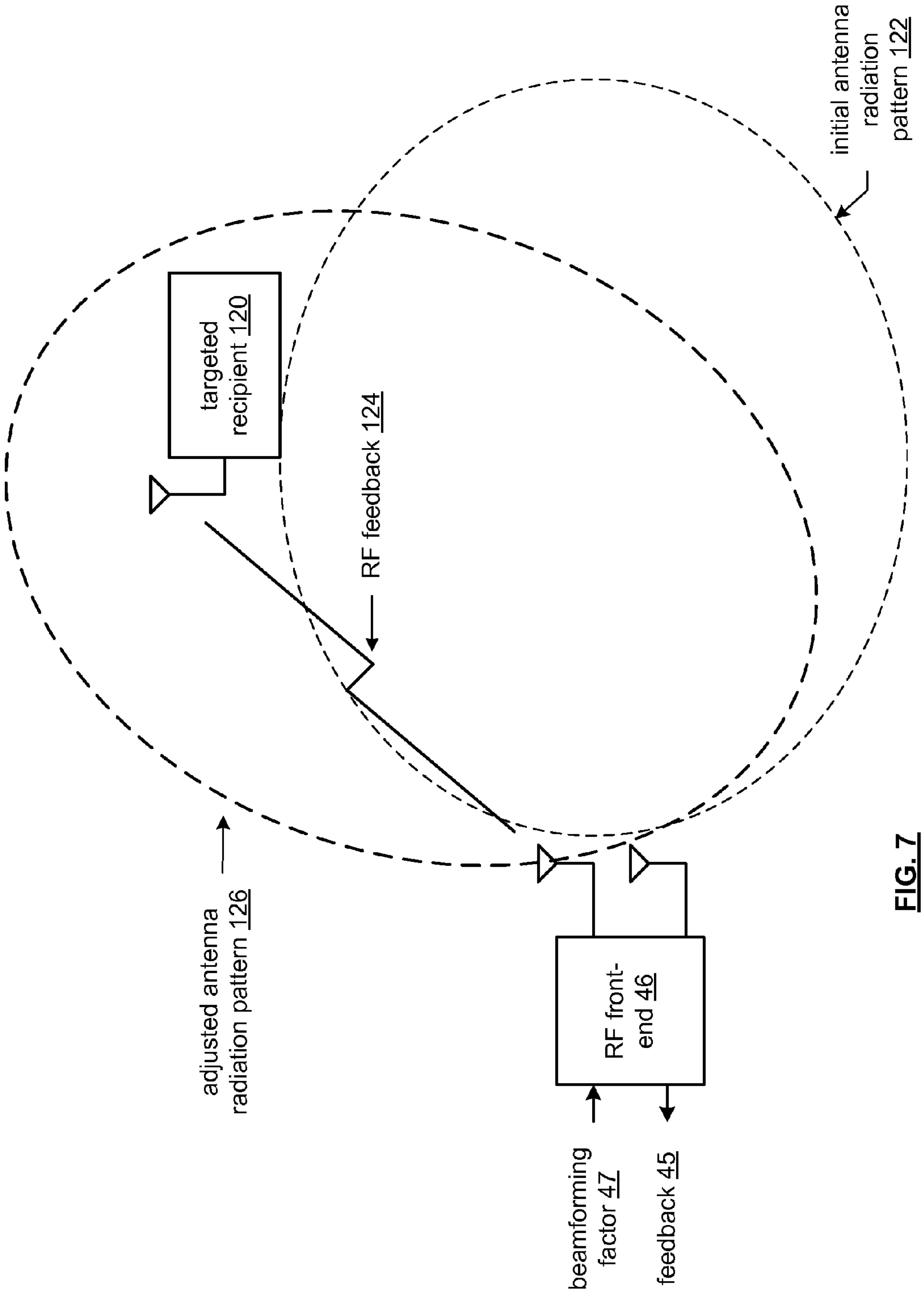
FIG. 7 is a schematic block diagram of beamforming in accordance with the present invention.

FIG. 7 is a schematic block diagram illustrating an example of beamforming in accordance with the present invention. As shown, the RF front-end 46 initially transmits in accordance with an initial setting for the beamforming factor 47. In this example, the initial antenna radiation pattern 122 is represented by the thin dashed line. Note, that for a monopole antenna, the initial antenna radiation pattern 122 may also have a similar pattern radiating in the opposite direction.

The targeted recipient 120, which may be an RFID tag, receives a transmission via the initial antenna radiation pattern 122 and provides an RF feedback 124 thereof. The RF feedback may include one or more of received signal strength (RSSI), bit error rate (BER), recovered power level (e.g., a voltage level generated from the received RF signal), et cetera. The RF front-end 46 provides the RF feedback 124 as feedback 45 to the processing module 40. The processing module 40, as will be described in greater detail with reference to FIGS. 8 and 9, interprets the feedback 45 to produce a new beamforming factor 47. In this example, the new beamforming factor 47 causes the RF front-end 46 to adjust its antenna radiation pattern 126 such that the targeted recipient 120 is in a higher energy field. As such, with the adjusted antenna radiation pattern 126, the targeted recipient 120 should have greater signal strength (e.g., about 3 dB or more improvement) when receiving RF signals transmitted by the RF front-end 46 thus improving the communication there between.

Figure 8:
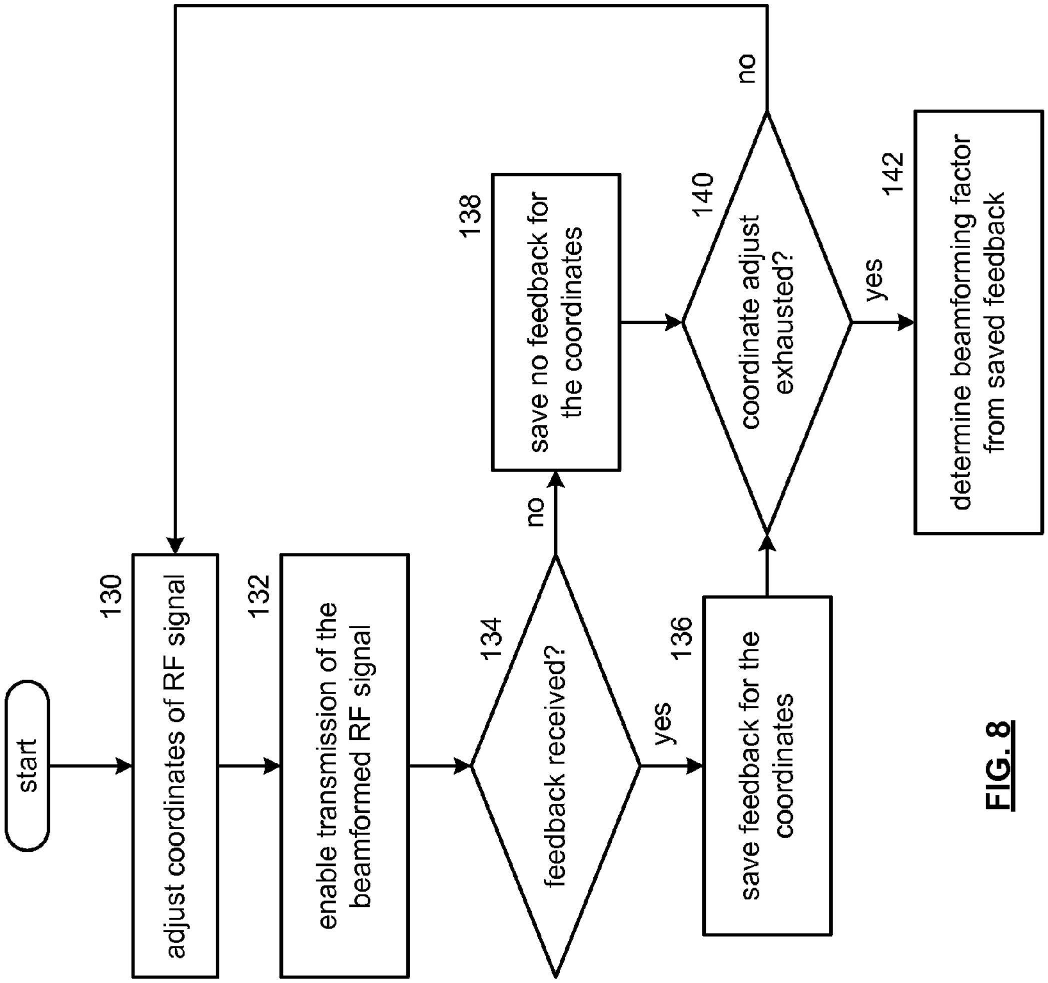
FIG. 8 is a logic diagram of a method for determining a feedback factor in accordance with the present invention.

FIG. 8 is a logic diagram of a method for determining the beamforming factor which begins at Step 130 where coordinates of an RF signal are adjusted to produce a plurality of sequentially adjusted coordinates of the plurality of RF signal components. For example and with reference to FIG. 4, the transmit adjust module 64 adjusts the phase angle of the outbound RF signal 90 sequentially from 0° to 360° at a desired increment value (e.g., every) 15° to produce the RF signal component 94 having the sequentially adjusted phase angle.

Returning to the discussion of FIG. 8, the process continues at Step 132 where, for each adjusted set of coordinates, transmission of the beamform signal is enabled. For example and with reference to FIG. 4, for each phase adjustment producing the RF signal component 94, the RF front-end 46 transmits the amplified RF signal components 92 and 94 to produce, in air, the beamformed signal 96. The process then proceeds to Step 134 where a determination is made as to whether feedback is received within a predetermined period of time. If feedback is not received within the predetermined period of time, it is assumed that no recipient is in range of the transmission thus, the process proceeds to Step 138. At Step 138, the indication that no feedback was received is saved with respect to this particular set of coordinates.

If, however, feedback was received, the feedback (e.g., RSSI, BER, recovered power level, etc.) is saved with respect to this particular set of coordinates (e.g., phase adjust producing RF signal component 94). The process then proceeds to Step 140 from either Steps 136 or 138 to determine whether all the coordinate adjustments have been exhausted. If not, the process repeats at Step 130.

Once all of the coordinate adjustments have been made, the process proceeds to Step 142 where the beamforming factor is determined from the saved feedback. In one embodiment, the coordinates producing the best received signal strength indication or lowest bit error rate as indicated by the feedback is selected for the beamforming factor. Alternatively, a particular threshold may be established such that any coordinate that produce a feedback above a certain level may be used. Further note that the adjustment of the coordinates may include adjusting the phase and/or amplitude of the outbound RF signal to produce the resulting RF signal components. Still further note that the adjustment of the coordinates may include adjusting the gain of one or more of the power amplifiers.

Figure 9:
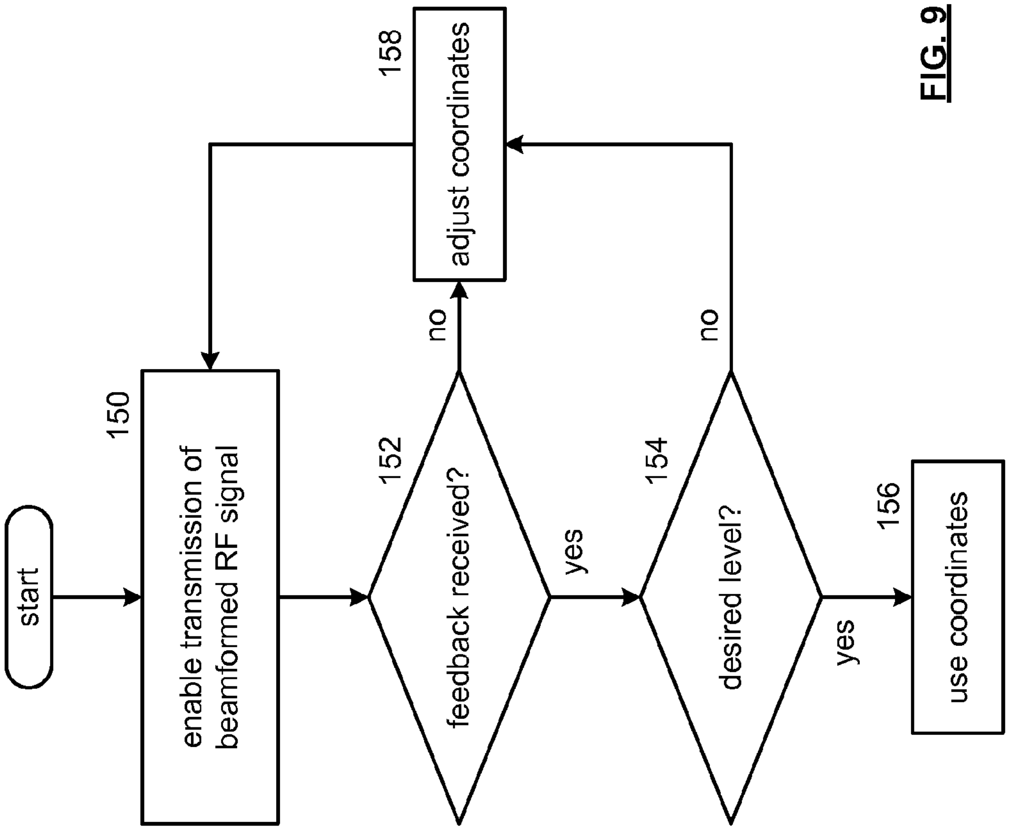
FIG. 9 is a logic diagram of a method for determining coordinates for beamforming in accordance with the present invention.

FIG. 9 is a logic diagram of another method for determining the beamforming factor. The process begins at Step 150 where, for a given adjustment of the coordinates of an RF signal to produce the plurality of RF signal components, transmission is enabled to produce a beamformed RF signal. The process then proceeds to Step 152 where a determination is made as to whether feedback is received within a predetermined period of time (e.g., less than 1 second). If not, the process proceeds to Step 158 where the coordinates (e.g., phase and/or amplitude) of the outbound RF signal are adjusted to produce a new set of RF signal components. The process then reverts to Step 150.

If, however, feedback is received at Step 152, the process proceeds to Step 154 where a determination is made as to whether the feedback indicates that the transmission is at a desired level. For example, the feedback may be interpreted to determine whether the received signal strength, bit error rate, et cetera are at or above a desired level. If not, the process reverts to Step 158 where the coordinates are again adjusted and the process is repeated. If, however, the feedback indicates that the transmission is at a desired level, the process proceeds to Step 156 where the coordinates are used as the beamforming factor.

As one of ordinary skill in the art will appreciate, the term "substantially" or "approximately", as may be used herein, provides an industry-accepted tolerance to its corresponding term and/or relativity between items. Such an industry-accepted tolerance ranges from less than one percent to twenty percent and corresponds to, but is not limited to, component values, integrated circuit process variations, temperature variations, rise and fall times, and/or thermal noise. Such relativity between items ranges from a difference of a few percent to magnitude differences. As one of ordinary skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (i.e., where one element is coupled to another element by inference) includes direct and indirect coupling between two elements in the same manner as "operably coupled". As one of ordinary skill in the art will further appreciate, the term "operably associated with", as may be used herein, includes direct and/or indirect coupling of separate components and/or one component being embedded within another component. As one of ordinary skill in the art will still further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The preceding discussion has presented a method and apparatus for a beamforming radio frequency circuit and applications thereof. As one of ordinary skill in the art will appreciate, other embodiments may be derived from the teaching of the present invention without deviating from the scope of the claims.

What is claimed is:

1. A radio frequency integrated circuit (RFIC) comprises:

an adjust module configured to adjust coordinates of an outbound RF signal to produce a plurality of RF signal components based on a beamforming factor, wherein the adjust module comprises, for each of the plurality of RF signal components:

a first gain stage to amplify an I component of the outbound RF signal in accordance with a first gain value to produce a gained I component;

a second gain stage to amplify a Q component of the outbound RF signal in accordance with a second gain value to produce a gained Q component; and an adder operably coupled to add the gained I component and the gained Q component to produce a corresponding one of the plurality of RF signal components, wherein the first and second gain values are based on the beamforming factor; and a plurality of power amplifiers configured to amplify the plurality of RF signal components output by the adjust module to produce a plurality of amplified RF signal components, wherein one or more of the plurality of power amplifiers have different gain settings based on the beamforming factor, and wherein the plurality of power amplifiers provide the plurality of amplified RF signal components to a plurality of antennas that transmit the plurality of amplified RF signal components.

2. The RFIC of claim 1, further comprising:

baseband processing module configured to convert outbound data into an outbound baseband signal; and an up-conversion module configured to convert the outbound baseband signal into an outbound RF signal.

3. The RFIC of claim 1, wherein the adjust module further comprises:

a receiver configured to receive feedback from a targeted recipient of the beamformed RF signal; and processing module configured to generate the beamforming factor based on the feedback, wherein the adjust module adjusts the coordinates of the outbound RF signal in accordance with the beamforming factor.

4. The RFIC of claim 3, wherein the processing module further functions to:

sequentially adjust the coordinates of the outbound RF signal to produce a plurality of sequentially adjusted coordinates of the plurality of RF signal components;

for each of the plurality of sequentially adjusted coordinates of the plurality of RF signal components:

enabling transmission of the beamformed RF signal;

determining whether feedback is received for the beamformed RF signal;

when the feedback is received, saving the feedback with respect to a corresponding one of the plurality of sequentially adjusted coordinates of the plurality of RF signal components to produce saved feedback; and determining the beamforming factor from the saved feedback.

5. The RFIC of claim 4, wherein the processing module further functions to:

enable transmission of the beamformed RF signal for a given adjustment of the coordinates of the plurality of RF signal components;

determine whether feedback is received for the beamformed RF signal;

when the feedback is received, determine whether the given adjustment of the coordinates of the plurality of RF signal components provides a desired level of transmission of the beamformed RF signal based on the feedback; and when the given adjustment of the coordinates of the plurality of RF signal components does not provide the desired level of transmission of the beamformed RF signal, further adjusting the coordinates of the plurality of RF signal components until the desired level of transmission of the beamformed RF signal is obtained.

6. The RFIC of claim 1, wherein the adjust module further functions to adjust transmit power of at least one of the plurality of power amplifiers based on the beamforming factor.

7. A radio frequency (RF) transmitter comprises:

an adjust module configured to adjust coordinates of an outbound RF signal to produce a plurality of RF signal components based on a beamforming factor, wherein the adjust module comprises, for each of the plurality of RF signal components:

a first gain stage to amplify an I component of the outbound RF signal in accordance with a first gain value to produce a gained I component;

a second gain stage to amplify a Q component of the outbound RF signal in accordance with a second gain value to produce a gained Q component; and an adder operably coupled to add the gained I component and the gained Q component to produce a corresponding one of the plurality of RF signal components, wherein the first and second gain values are based on the beamforming factor; and a plurality of power amplifiers configured to amplify the plurality of RF signal components output by the adjust module to produce a plurality of amplified RF signal components, wherein one or more of the plurality of power amplifiers have different gain settings based on the beamforming factor; and a plurality of antennas operably coupled to transmit the plurality of amplified RF signal components to produce a beamformed RF signal.

8. The RF transmitter of claim 7, wherein the adjust module further functions to adjust the gain setting of at least one of the plurality of power amplifiers based on the beamforming factor.

9. The RF transmitter of claim 7 further comprises:

the first gain stage amplifying the I component of the outbound RF signal in accordance with a first gain value; and the second gain stage amplifying the Q component of the outbound RF signal in accordance with a second gain value, wherein the first and second gain values establish a desired coordinate for the corresponding one of the plurality of RF signal components.

10. The RF transmitter of claim 7 further functions to:

receive feedback from a targeted recipient of the beamformed RF signal; and generate the beamforming factor based on the feedback.

11. The RF transmitter of claim 10 further functions to:

sequentially adjust coordinates of the outbound RF signal to produce a plurality of sequentially adjusted coordinates of the plurality of RF signal components;

for each of the plurality of sequentially adjusted coordinates of the plurality of RF signal components:

enabling transmission of the beamformed RF signal;

determining whether feedback is received for the beamformed RF signal;

when the feedback is received, saving the feedback with respect to a corresponding one of the plurality of sequentially adjusted coordinates of the plurality of RF signal components to produce saved feedback; and determining the beamforming factor from the saved feedback.

12. The RF transmitter of claim 10 further functions to:

enabling transmission of the beamformed RF signal for a given adjustment of coordinates of the plurality of RF signal components;

determining whether feedback is received for the beamformed RF signal;

when the feedback is received, determining whether the given adjustment of the coordinates of the plurality of RF signal components provides a desired level of transmission of the beamformed RF signal based on the feedback; and when the given adjustment of the coordinates of the plurality of RF signal components does not provide the desired level of transmission of the beamformed RF signal, further adjusting the coordinates of the plurality of RF signal components until the desired level of transmission of the beamformed RF signal is obtained.

13. The RF transmitter of claim 7, wherein the plurality of antennas comprises:

a first antenna having a first polarization; and a second antenna having a second polarization.

14. A radio frequency (RF) front end comprises:

a transmitter section including:

an adjust module configured to adjust coordinates of an outbound RF signal to produce a plurality of RF signal components based on a beamforming factor;

a plurality of power amplifiers configured to amplify the plurality of RF signal components output by the adjust module to produce a plurality of amplified RF signal components, wherein one or more of the plurality of power amplifiers have different gain settings based on the beamforming factor; and a plurality of antennas operably coupled to transmit the plurality of amplified RF signal components to produce a beamformed RF signal;

a receiver section that receives an RF feedback signal from a targeted recipient of the beamformed RF signal, wherein the beamforming factor is generated based on the RF feedback signal; and wherein the adjust module is further configured to, when the RF feedback signal indicates that a desired level of transmission of the beamformed RF signal is not provided by the plurality of antennas, further adjusting the coordinates of the outbound RF signal components and one or more of the gain settings of the plurality of power amplifiers.

15. The radio frequency (RF) front end of claim 14, wherein the receiver section comprises:

a plurality of low noise amplifiers, wherein the plurality of antennas receive the RF feedback signal and provide therefrom a plurality of beamformed signal components to the plurality of low noise amplifiers;

the plurality of low noise amplifiers operably coupled to amplify the plurality of beamformed signal components to produce a plurality of adjusted signal components; and the adjust module operably coupled to determine adjusted coordinates of the plurality of adjusted signal components and to recapture the signal based on the adjusted coordinates.

16. The radio frequency (RF) front end of claim 15 further comprises:

an antenna coupling module operably coupled to provide the plurality of amplified RF signal components from the plurality of power amplifiers to the plurality of antennas and to provide the plurality of beamformed signal components from the plurality of antennas to the plurality of low noise amplifiers.

* * * * *